United States Patent [19]

De Blauwe et al.

[11] Patent Number: 4,569,868
[45] Date of Patent: Feb. 11, 1986

[54] HEAT-RECOVERABLE ARTICLE

[75] Inventors: Francis J. A. M. C. De Blauwe, Lubbeck; Frank K. A. Selleslags, Haasrode, both of Belgium

[73] Assignee: N.V. Raychem S.A., Kessel-Lo, Belgium

[21] Appl. No.: 71,762

[22] Filed: Aug. 31, 1979

Related U.S. Application Data

[63] Continuation of Ser. No. 849,214, Nov. 7, 1977, abandoned.

[30] Foreign Application Priority Data

Nov. 8, 1976 [GB] United Kingdom ............ 46473/76
Aug. 30, 1977 [GB] United Kingdom ............ 36246/77

[51] Int. Cl.$^4$ .................... F16B 4/00; F16L 55/10; B65D 59/00
[52] U.S. Cl. ..................... 428/35; 428/212; 174/DIG. 8; 138/95; 138/96 R; 403/29; 403/30; 285/381
[58] Field of Search ........ 174/74 A, DIG. 8; 138/89, 95, 96 R, 119, 140, DIG. 5; 285/381; 403/28, 29, 30, 273; 264/230, 249, 25; 156/84, 85, 86, 344; 428/35, 36, 43, 212, 913

[56] References Cited

U.S. PATENT DOCUMENTS

| 3,448,182 | 6/1969 | Derbyshire et al. | 264/230 |
| 3,526,683 | 9/1970 | Heslop et al. | 174/DIG. 8 |
| 3,678,174 | 7/1972 | Ganzhorn | 174/84 R |
| 3,847,183 | 11/1974 | Meyer | 138/96 R |
| 3,992,570 | 11/1976 | Beinhauer | 174/74 A |
| 4,194,082 | 3/1980 | Campbell | 174/DIG. 8 |
| 4,196,308 | 4/1980 | Siden | 174/DIG. 8 |

FOREIGN PATENT DOCUMENTS

| 2321754 | 4/1977 | France . |
| 1248908 | 10/1971 | United Kingdom . |
| 1437177 | 8/1973 | United Kingdom . |
| 1385776 | 2/1975 | United Kingdom . |
| 1389912 | 4/1975 | United Kingdom . |

Primary Examiner—John E. Kittle
Assistant Examiner—James J. Seidleck
Attorney, Agent, or Firm—Sheldon & Mak

[57] ABSTRACT

Heat-recoverable articles, especially heat-shrinkable tubular articles, having an open end are formed so that the section adjacent said open end has a lower recovery ratio than a section adjacent thereto, thereby substantially reducing the risk of splitting when the degree of recovery is high or in applications where a high degree of unrecovered strain remains after recovery about a substrate such as a supply line. A preferred article is a tubular cap which has an open end section having a first expansion ratio, an intermediate section having a second expansion ratio and a closed end section having a third expansion ratio, the second expansion ratio being greater than the first and third expansion ratios. Such a cap may be employed to seal a conduit against ingress of moisture and other contaminants. When a supply line is subsequently to be passed through the conduit the closed end may be removed and the article shrunk to grip the supply line.

12 Claims, 9 Drawing Figures

HEAT-RECOVERABLE ARTICLE

CROSS REFERENCE TO RELATED APPLICATIONS

This application is a continuation of our application Ser. No. 849,214 filed Nov. 7, 1977, now abandoned.

Related to this application is application Ser. No. 849,425 of Bruce Campbell filed Nov. 7, 1977, now abandoned.

BACKGROUND OF THE INVENTION

This invention relates to heat-recoverable articles.

Heat-recoverable articles, especially heat-shrinkable articles, are now widely used in many areas where insulation, sealing and encapsulation are required. Usually these articles recover, on heating, towards an original shape from which they have been previously deformed, but the term "heat-recoverable" as used herein also includes an article which, on heating, adopts a new configuration, even if it has not been previously deformed.

Heat-recoverable articles are typically made from polymeric materials exhibiting the property of plastic or elastic memory as described, for example, in U.S. Pat. Nos. 2,027,962, 3,086,242 and 3,957,382. In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Such heat-recoverable articles are frequently in the form of heat-shrinkable tubes, caps or boots or other articles having a closed cross-section and one or more open ends. One widely used method of making such articles is to mould a molten, crystalline, thermoplastic polymer into a shape which approximates to the shape of the final covering required; cross-link the shaped polymer; heat the cross-linked, shaped polymer to a temperature above its crystalline melting point; expand the hot, cross-linked, shaped polymer, e.g. by a mandrel or internal pressure; and cool the polymer in its expanded shape. The present invention especially relates to such heat-shrinkable articles, including in particular (but not limited to) those made by the process described above.

One serious limitation of such heat-shrinkable articles has been that if too high an expansion ratio (i.e. the ratio of the dimension of the article after expansion to the corresponding dimension before expansion) is used in making the article, the article tends to split on expansion or during shrinkage, and we have observed that this problem is particularly noticeable at the open ends of such articles. The problem is especially acute if the article has been cut so as to leave a notch or nick which may propagate on recovery and/or when the article is caused to recover about a large substrate leaving a high degree of unresolved recovery. In accordance with the present invention, we have discovered that it is advantageous if the or each open end of the article is formed by a section such that, when the article is fully shrunk, the open end is larger than the adjacent portion of the article. In particular we have found that the adjacent portion can then be given a higher expansion ratio than would otherwise be possible without danger of splitting.

BRIEF SUMMARY OF THE INVENTION

The present invention provides a hollow heat-recoverable article having one or more open ends, characterised in that the amount of available recovery in a first region at an open end is substantially less than the amount of available recovery in a second region adjacent said first region and remote from said open end.

DETAILED DESCRIPTION OF THE INVENTION

As mentioned above, the present invention is especially applicable to heat-shrinkable articles made from materials, especially plastics materials, possessing the property of elastic or plastic memory (although it can also be usefully applied to other forms of heat-recoverable articles, including heat-expandable articles), and, for convenience, it will from now on be described with reference to such heat-shrinkable articles. In said articles the "available recovery" which, as used herein, means the recovery which can be obtained in the absence of external restraint, will be approximately equal to the applied expansion (although, because of stress relaxation, the expansion may be up to about 5% higher).

Amongst such heat-shrinkable articles there may especially be mentioned those with a closed cross-section, although, in some instances, the invention may usefully be applied to so-called wrap-around devices of the sort described in, for example, U.S. Pat. Nos. 3,243,211; 3,297,819 and 3,379,218 and British Pat. Nos. 1,155,470; 1,211,988 and 1,346,479. The articles are commonly tubular, having one or more open ends, the term "tubular" including both hollow cylindrical members and members of irregular and/or varying cross-section as well as those of more complex configuration such as Y-shaped, T-shaped and X-shaped members having 3 or 4 ends.

In most cases the end section will have a larger cross-section after recovery than the adjacent second section which has a substantially greater degree of recovery. The end section may have a finite length, for example, it may extend over a length of from 1 to 10 cm., but, in some cases the article may be given a differential expansion so as to produce an increasing expansion ratio along its length away from the open end and the present invention is, therefore, not limited to heat-recoverable articles having a discrete end region.

It will be appreciated that the end region may be non-recoverable, i.e. it may have an expansion ration of 1, but, in many applications, it will be advantageous for it to exhibit a small degree of heat-recovery. However, in such cases the recovery is preferably less than 100%, more preferably less than 25% (corresponding to expansion ratios of 2 and 1.25, respectively).

On the other hand, in order fully to utilise the advantages of the present invention, the second region generally exhibits a high degree of available recovery. The expansion ratios which will, in the absence of end sections as required by the present invention lead to splitting on shrinkage are dependent inter alia on the polymer employed and the thickness. There is seldom a problem with expansion ratios below 2.5, and usually expansion ratios of up to 3.0 can safely be used. However, at expansion ratios of 3.5 or higher splitting is usually a problem and this applies more so at ratios of 4.0, 4.5 and 5.0. Thus the present invention is especially applicable at ratios of from 4 to 6 and above, for example up to 10, i.e. where the amount of available recovery is from 400% to 1000%, usually from 400% to 600%, especially when the percentage of unresolved recovery after shrinkage is high.

Another factor which is relevant to the problem is the difference between the expansion ratios of the end region and the second, adjacent region. Generally speaking, the higher the expansion ratios, the greater should this difference be, but, in most cases a difference of at least 0.5, preferably at least 1.0 and, most preferably, at least 1.5, will be desirable. The difference should preferably be at least 0.4 times, especially at least 0.5 times, the expansion ratio of the second adjacent region.

It will be appreciated that the heat-recoverable articles of the present invention may have two or more open ends in which case the invention may advantageously be applied to each open end. Furthermore, the articles may have one or more ends which are closed but which are intended to be opened, for example, by cutting, at a later stage; the invention may also advantageously be applied to such temporarily closed ends.

The preferred articles of the present invention may be prepared from any of the polymers and mixtures of polymers known from the prior art to be useful for the production of heat-shrinkable articles. Generally the articles will be monolithic and of constant composition throughout; however, laminates of two heat-shrinkable polymers can be used, and the articles can be constructed by joining together, e.g. with adhesive, two or more different parts. Suitable polymers include polyolefins, especially polyethylene; copolymers of ethylene and vinyl acetate, (which are particularly valuable when flexibility is required), copolymers of ethylene and ethyl acrylate; chlorinated or fluorinated polymers, especially polyvinyl chloride, polyvinylidene fluoride and polymers incorporating units derived from polyvinylidene fluoride, hexafluoroethylene and chlorotrifluoroethylene; and rubbers such as ethylenepropylene rubber, chlorinated rubbers (Neoprene) and silicone rubbers which may be used in a blend with a crystalline or glassy polymer such as an olefin polymer.

The internal surface of the articles may be provided with a sealant such as a hot-melt adhesive or a mastic. Especially suitable hot-melt adhesives include for example polyamide materials, ethylene/vinyl acetate copolymers and terpolymers (with or without incorporated waxes) and polyesters. Such materials are described, for example, in British Pat. No. 1,440,810 and German OS No. 2,709,717. Also suitable are curable adhesives which also melt and flow upon heating, but which will not afterwards be hot-meltable. There may also be mentioned epoxy resins and conventional mastics such as, for example, those based on butyl and isobutylene rubbers modified with suitable materials known in the art. Obviously the type of sealant employed and the method of its application will depend on the particular requirements in any given case.

Bearing in mind the above discussion it will be appreciated that the shape and design characteristics of the heat-recoverable articles of the present invention will depend on the use intended for them. In some cases, it may be preferable for the open end regions to be thicker than the adjacent high-recovery regions in which case it may be convenient to prepare a moulded article which has (prior to expansion) the same wall thickness throughout so that the ratio of the thickness of the open end section(s) to the thickness of the adjacent section(s) after expansion will be substantially the same as the inverse ratio of their expansion ratios.

Similarly, the shape, after shrinkage, of the open end region and the adjacent region will be dependent of the relative sizes of the article and of the substrate as well as the expansion ratios of the two regions. Thus both regions may shrink into contact with the substrate along their entire length. More usually, however, the open end section will spontaneously recover on heating to a size larger than the substrate and will, therefore, form a collar at the end of the article which flares out of contact with the substrate. Depending upon the application concerned, this collar may be left in place or may be subsequently cut off.

In general, the heat-recoverable articles will be in the form of a tubular sleeve having two open ends or a tubular cap having one open end and one closed end, the sleeve or cap is preferably of circular cross-section, although it may have another cross-section, and it is often preferable that it should have a substantially constant cross-section.

The articles are preferably monolithic, i.e. are moulded or otherwise formed as one part, but they may be made from two or more parts bonded together, for example with an adhesive, or otherwise attached one to the other.

The heat-recoverable articles of the present invention are especially useful when the degree of recovery required in a given application is, or may be, very high because the articles are capable of providing a high degree of recovery or accommodating a high degree of unrecovered strain without splitting. Amongst suitable applications there may be mentioned the following.

One preferred embodiment of the invention is a tubular cap which comprises an open end section having a first expansion ratio, an intermediate section having a second expansion ratio and a closed end section having a third expansion ratio, the second expansion ratio being greater than the first and third expansion ratios, which may be substantially the same or different. Such a cap can be used to seal the end of a hollow conduit, for example of the kind placed underground or in buildings, so that supply lines, telephone cables etc. can later be passed through them. The open end section only of the article is placed over the end of the conduit, and is then heated to cause shrinkage thereof into contact with the conduit while preventing substantial shrinkage of the remainder of the article. One way of preventing shrinkage of the remainder of the article is for the article to have an open end section whose internal circumference is slightly larger than the external circumference of the intermediate section and the closed end section, and a flexible intermediate section, so that by pushing along the axis of the tube, the intermediate section and closed end section can be telescoped through the open end section and into the interior of the conduit, where they are protected from heat applied to the open end section. The intermediate region is, for this purpose, preferably made from a flexible polymeric composition such, for example as one based on an ethylene/vinyl acetate copolymer. Preferably the end section has a protruberance on the outside thereof which can be gripped to pull it and the intermediate section out of the conduit after the open end section has been shrunk onto the conduit.

The great advantage of sealing a conduit in this way is that the conduit is now sealed by a cap which can be used to seal the junction between the conduit and a cable (or supply line or other elongate substrate) which is subsequently fed through the conduit. At that time, the end of the closed end section is cut off to create a second open end section having an expansion ratio greater than the expansion ratio of the intermediate section; the elongate substrate is passed through the hollow conduit and the second open end section; and the intermediate section and second open end section are heated to cause shrinkage of the intermediate section into contact with the elongate substrate. It is to be noted that the presence of the second open end section means that the intermediate section can be given a higher expansion ratio, and can therefore seal to substrates of a wider range of sizes, than would otherwise be possible.

The dimensions and expansion ratios of a cap according to this embodiment of the invention will of course be dependent on the conduit to be sealed and the elongate substrate, but typically the open end section is 2 to 10 cm. long, the intermediate section is 2 to 15 cm. long and the closed end section is 1 to 5 cm. long, and the cap has an internal diameter of 2 to 15 cm.

A variation of this preferred embodiment is a cap which has an open end section which is not heat-shrinkable but is sized to be a push fit on the conduit. Such a cap is not initially a heat-shrinkable article according to the invention, but such an article is produced in the course of installation when the end of the closed end section is cut off.

A second preferred embodiment of the invention is a tubular cap which comprises an open end section having a first expansion ratio, an intermediate section having a second expansion ratio and an unexpanded closed end section, the second expansion ratio being greater than the first expansion ratio. Such a cap is particularly useful for providing a sealed end cap over an elongate substrate having a terminal portion of size greater than the main part of the substrates, especially a telephone cable comprising a plurality of wires to which connectors have been attached. To an ever increasing extent, connectors are being installed on telephone cables in the factory, in order to avoid some of the expense and inconvenience of working at the installation site, and it is vitally important to protect the end section, having the connectors attached thereto, while the cable is taken from factory to site. To install the cap, it is placed over the substrate so that the closed end section extends over terminal portion as far as the main part of the substrate, and the intermediate section of the article is then heated to cause shrinkage thereof into contact with the main part of the cable, but not into contact with the terminal portion of the substrate. It is to be noted that the presence of the open end section of lower expansion ratio means that the intermediate section can be given a higher expansion ratio, and can therefore pass over a larger terminal portion, than would otherwise be the case. This improvement is of particular importance in the case of telephone cables as described above, since the multitude of connectors which must be attached to the individual wires (often 400 or more in number) occupy a considerable space, whose circumference is often at least 4 times, for example about 6 times, the circumference of the main part of the cable, to which the intermediate section of the cap must shrink and seal.

The dimensions and expansion ratios of a cap according to this second embodiment of the invention will of course be dependent on the substrate, but typically the open end section is 1 to 7.5 cm., preferably 1 to 5 cm. long, the intermediate section is 2 to 15 cm., preferably 7 to 12 cm., long and the closed end section is 20 to 100 cm. long, and the cap has diameter of 10 to 25 cm.

It will be appreciated that the heat-recoverable articles of the invention may be made by various methods and that the invention is not limited to any particular method for their manufacture. However, in a preferred embodiment, the present invention also provides a method of making a heat-recoverable article which comprises (1) moulding a molten, thermoplastic, crystalline polymer into a shaped article having a closed cross-section and at least one open end, the or each of said open ends being defined by an end section whose internal circumference is greater than the internal circumference of the section of the article adjacent thereto;
(2) cross-linking the moulded article;
(3) heating the cross-linked moulded article above the crystalline melting point of the polymer;
(4) expanding the heated article; and
(5) cooling the article while maintaining it in the expanded condition.

In its third aspect the invention provides a method of covering a part of an elongate substrate which comprises placing around said part of the substrate at least part of a heat-shrinkable article as described above and heating at least part of the article to cause shrinkage thereof into contact with the substrate.

DETAILED DESCRIPTION OF THE DRAWINGS

Figure 1:
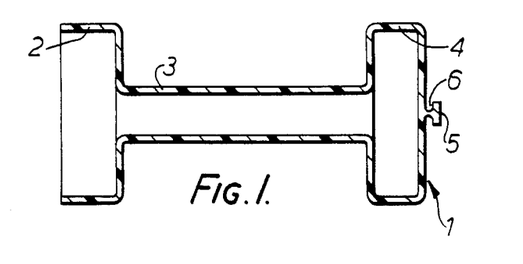
FIG. 1 is a side elevation, partly in section, of an article in its dimensionally heat stable form.

Referring now to the drawings, FIGS. 1 to 5 illustrate the use of a heat-recoverable article according to the invention as a sealing means for a conduit. As shown in FIG. 1, the sealing means comprises a hollow member, designated generally by reference numeral 1, in its dimensionally heat stable configuration, having an open end region 2, an intermediate region 3 and a closed end region 4. A gripping protuberance 5 is located at 6 on the closed end 4 of the hollow member 1. In this embodiment the diameter of the open end region 2 and that of the closed end region 4 are considerably larger than the diameter of the intermediate region 3.

Figure 2:
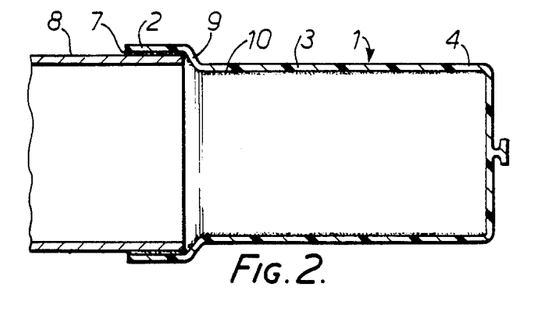
FIG. 2 is a side elevation, partly in section, of the heat-recoverable article of FIG. 1 in its heat-recoverable form and positioned about the end of a conduit.

Referring to FIG. 2, the hollow member 1 is shown in its dimensionally heat unstable configuration wherein the internal diameter of the intermediate region 3 and that of the closed end region 4 are substantially the same. The open end region 2 is shown in position about an open end 7 of a conduit 8 (partly shown). Regions 2 and 3 are joined by a frustoconical region 9 and the hollow member 1 is internally coated with a hot melt adhesive 10.

Figure 3:
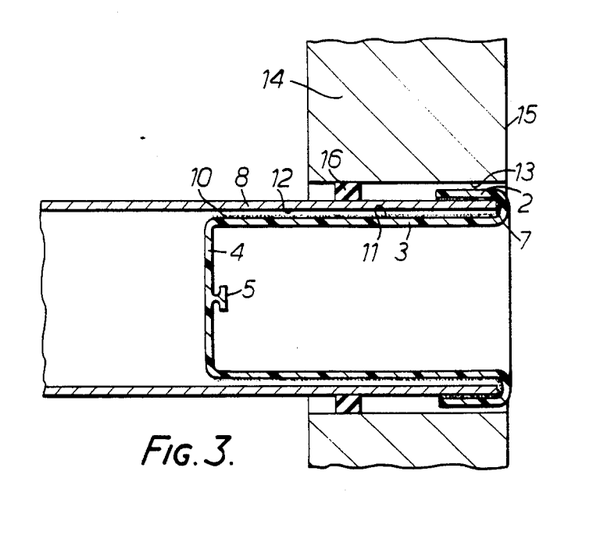
FIG. 3 is a side elevation, partly in section, of the heat-recoverable article of FIGS. 1 and 2 after it has been inverted within the conduit.

In FIG. 3 the open end region 2 of the hollow member 1 is shown heat recovered about the open end 7 of the conduit 8. The intermediate region 3 and the closed end region 4 have been inverted and telescoped within the conduit 8 so that the internal surface 11 of the intermediate region 3 is adjacent to the internal surface 12 of the conduit 8. The conduit 8 with the hollow member 1 attached has been pushed into a hole 13 in a manhole wall 14 until its open end 7 is substantially flush with the wall surfacd 15. An O-ring 16 is provided for sealing the gap between the outer surface of the conduit 8 and the hole 13 in the manhole 14. Of course, it is possible, if desired, for the O-ring 16 to seal the gap between the hole 13 and the outer surface of the open end region 2 of the hollow member 1. When it is required to insert a cable through conduit 8 the intermediate region 3 and the closed end region 4 can be removed from the inside of conduit 8 by pulling on the gripping protuberance 5.

Figure 4:
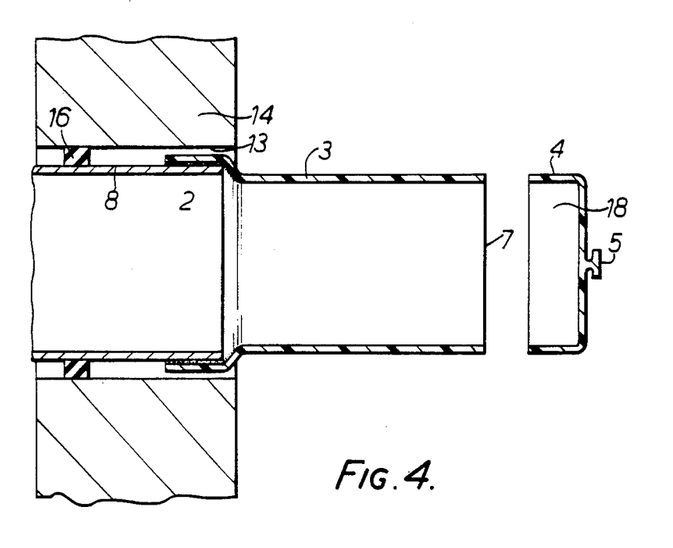
FIG. 4 is a further side elevation, partly in section, of the heat-recoverable article of FIGS. 1 to 3 after it has been pulled out from within the conduit.
Figure 5:
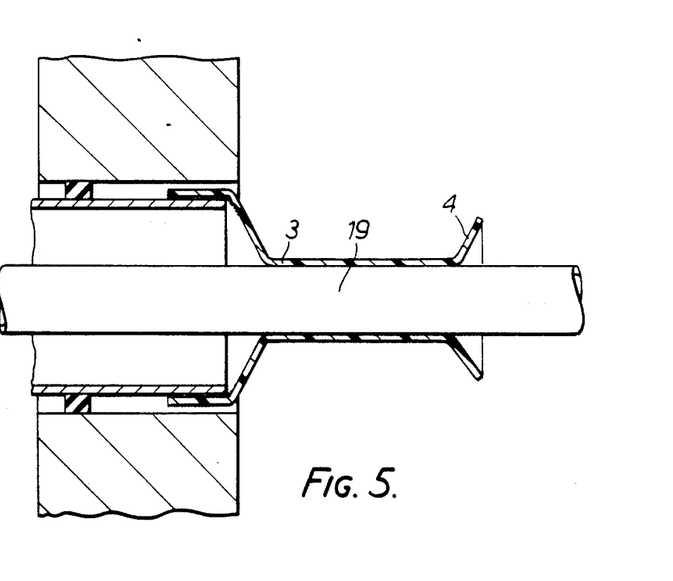
FIG. 5 is a side elevation, partly in section, of the heat-recoverable article of FIGS. 1 to 4 after it has been recovered about a supply line positioned within the conduit.

As shown in FIG. 4 the intermediate region 3 and the closed end region 4 have been pulled from inside the conduit 8 so that they protrude from the hole 13 in the manhole 14. The hollow member 1 has been slit at 17 in the second end region 4 and the cap-shaped remainder 18 having protuberance 5 is discarded. The open-ended hollow member positioned about the conduit 8 is now ready to receive cable 19. The intermediate region 3 is subjected to sufficient heat to shrink it onto the cable 19 as shown in FIG. 5. The remaining portion of the end region 4 is not capable of recovering onto the cable 19 and is puckered but does not split.

Figure 6:
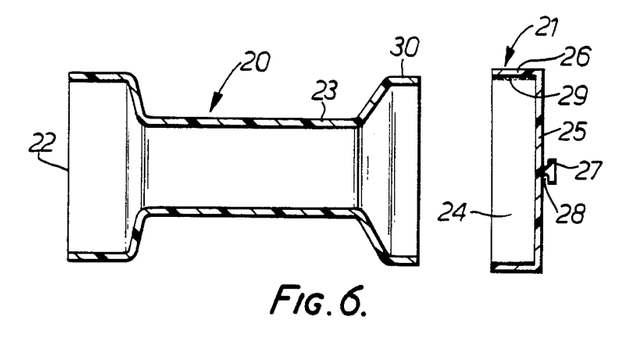
FIG. 6 is a side elevation, partly in section, of a second article of the invention in its dimensionally heat stable form.
Figure 7:
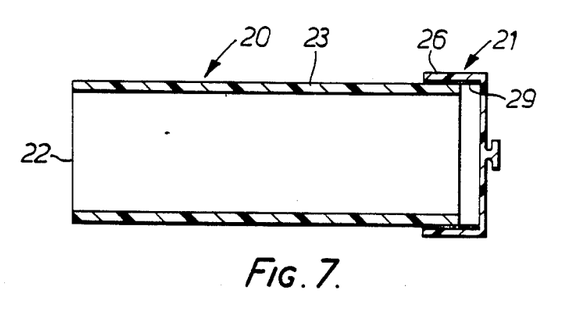
FIG. 7 is a side elevation, partly in section, of the article of FIG. 6 in its heat-recoverable form.

FIGS. 6 and 7 show a further heat-recoverable article suitable for us as a sealing means. The sealing means, in its dimensionally heat stable configuration, is composed of two separate portions shown generally at 20 and 21 respectively. Both portions are capable of being rendered heat shrinkable and are assembled together as shown in FIG. 7. Portion 20 which is an open ended sleeve-like member comprises a first open end 22 and a second open end 30 of greater internal diameter than tubular portion 23 which is intermediate of said open ends. Portion 21 is a cap-like member having an open end 24 joined to a closed end 25 by tubular section 26 and provided at 28 with a gripping protuberance 27. The tubular section 26 of portion 21, the internal diameter of which is similar to that of open end 22 of portion 20, is coated internally with a hot melt adhesive 29.

As shown in FIG. 7 both portions 20 and 21 have been expanded radially to increase their cross-section, the cross-section of tubular section 26 of portion 21 being marginally larger than that of tubular section 23 of portion 20. Section 23 is inserted into tubular section 26 while held on a mandrel (not shown). Tubular section 26 has been recovered onto tubular portion 23, the hot melt adhesive 29 providing a seal between the two.

When the sealing means thus formed has cooled the mandrel is removed.

Figure 8:
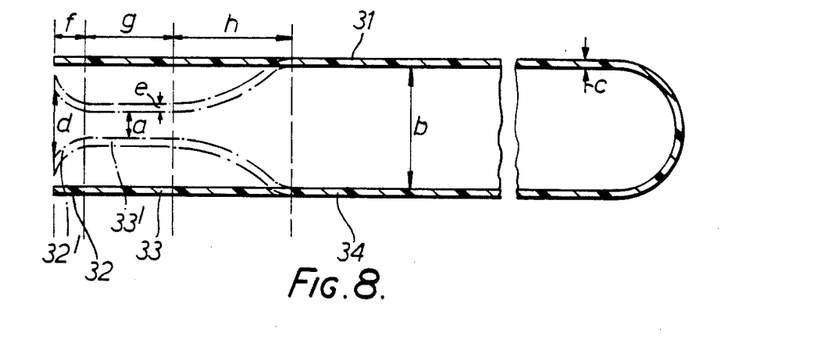
FIG. 8 is a cross-section through a heat-recoverable article according to the present invention formed as an end cap.
Figure 9:
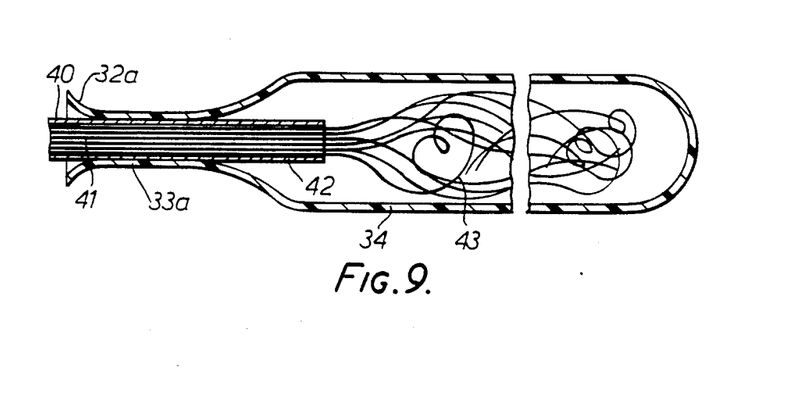
FIG. 9 is a cross-section showing the end cap of FIG. 8 installed about a telephone cable having connectors attached to the individual wires thereof.

FIGS. 8 and 9 illustrate a second preferred use of the present invention.

As shown in FIG. 8 the heat-recoverable article is formed as an end cap 31 which has an open end section 32 having an expansion ratio of about 2 at the open end thereof, an intermediate section 33 which has an expansion ratio of about 5, and a closed end portion 34 which is not heat-shrinkable. The cap is made from high density polyethylene. The dotted lines in FIG. 1 show sections 32' and 33' of the article prior to expansion which become sections 32 and 33. Typical dimensions, in inches, of three such end caps are as follows:

|     | a    | b   | c     | d    | e    | f | g | h |
|-----|------|-----|-------|------|------|---|---|---|
| 1st | 0.80 | 4.0 | 0.075 | 2.80 | 0.15 | 1 | 3 | 4 |
| 2nd | 1.50 | 6.0 | 0.105 | 3.50 | 0.15 | 1 | 3 | 4 |
| 3rd | 2.50 | 8.0 | 0.135 | 4.50 | 0.15 | 1 | 3 | 4 |

All three caps have a total length of 34 inches and the cap of FIG. 8 is shown in truncated form for convenience.

Referring now to FIG. 9, telephone cable 40 comprises a plurality of wires 41 encased by a protective sheath 42 which has been removed from the end of the cable. Connectors have been attached to the ends of the wires 41, and the mass of wires and connectors is designated generally by 43. An end cap 31 as shown in FIG. 8 has been passed over the mass of wires and connectors 43 and the sections 32 and 33 have been heated so that they shrink to provide shrunken sections 32a and 33a respectively. Section 33a is in contact with the cable while section 32a, having a lower expansion ratio, forms a flared collar.

We claim:

1. A hollow heat-shrinkable article composed of a polymeric material and having a closed cross-section and at least one open end, each open end being defined by an open end section having adjacent thereto an intermediate section, the open end section having a first expansion ratio which is from 1 to 3.0 and the intermediate section having a second expansion ratio which is at least 3.0 and at least 0.5 greater than said first expansion ratio, whereby the amount of available recovery in the open end section is substantially less than the amount of available recovery in the intermediate section, the circumference of the open end section after unrestrained recovery of the article being substantially greater than the circumference of the intermediate section.

2. An article according to claim 1 wherein said second expansion ratio is at least 4.0.

3. An article according to claim 2 wherein said second expansion ratio is 4.0 to 6.0.

4. An article according to claim 1 wherein said second expansion ratio is at least 5.0.

5. An article according to claim 1 wherein said first expansion ratio is from 1.0 to 2.0.

6. An article according to claim 1 wherein the difference between the first and second expansion ratios is at least 0.5 times the second expansion ratio.

7. An article according to claim 1 in the form of a tube having two open ends and a substantially constant cross-section.

8. An article according to claim 1 which is in the form of a tubular cap and which comprises in addition to said open end section and said intermediate section, a closed end section which is adjacent said intermediate section, which defines the closed end of the cap and which has a third expansion ratio which is from 1.0 to 3.0 and at least 0.5 less than said second expansion ratio.

9. An article according to claim 8 wherein said first and third expansion ratios are substantially the same.

10. An article according to claim 8 wherein the internal circumference of the open end section is slightly larger than the external circumference of the intermediate section and the closed end section, and the intermediate section is composed of flexible material such that the closed end section and intermediate section can be telescoped through the open end section by pushing along the axis of the cap.

11. An article according to claim 8 wherein the open end section is 2 to 10 cm. long, the intermediate section is 2 to 15 cm long and the closed end section is 1 to 5 cm long, said article having throughout its length a substantially circular cross-section of diameter 2 to 15 cm.

12. A hollow heat-shrinkable article composed of a polymeric material and having a closed cross-section and at least one open end, each open end being defined by an open end section having adjacent thereto an intermediate section, the open end section having a first expansion ratio which is from 1 to 3.0 and the intermediate section having a second expansion ratio which is at least 3.0 and at least 0.5 greater than said first expansion ratio, whereby the amount of available recovery in the open end section is substantially less than the amount of available recovery in the intermediate section, the circumference of the open end section after unrestrained recovery of the article being substantially greater than the circumference of the intermediate section; the internal circumference of the open end section being slightly larger than the external circumference of the intermediate section and the closed end section, and the intermediate section being composed of flexible material such that the closed end section and intermediate section can be telescoped through the open end section by pushing along the axis of the cap; and said article having a gripping protruberance on the outside of the closed end section.

* * * * *

UNITED STATES PATENT AND TRADEMARK OFFICE
CERTIFICATE OF CORRECTION

PATENT NO. : 4,569,868

DATED : February 11, 1986

INVENTOR(S) : Francis J.A.M.C. De Blauwe & Frank K.A. Selleslags

It is certified that error appears in the above-identified patent and that said Letters Patent are hereby corrected as shown below:

Add the following claims 13-22.

13. A method of covering a part of an elongate substrate which comprises the steps of:

(a) placing around said part of the substrate at least part of a hollow heat-shrinkable article composed of a polymeric material and having at least one open end, each open end being defined by an open end section having adjacent thereto an intermediate section, the open end section having a first expansion ratio which is from 1.0 to 3.0 and the intermediate section comprising a region having a second expansion ratio which is at least 3.0 and at least 0.5 greater than said first expansion ratio, whereby the amount of available recovery in the open end section is substantially less than the amount of available recovery in the intermediate section adjacent thereto, at least an open end section and an adjacent intermediate section of the article being placed around the substrate; and (b) heating said open end section and said intermediate section of said article to cause shrinkage of said intermediate section into contact with the substrate and to cause shrinkage of said open end section to form a collar which flares out of contact with the substrate.

UNITED STATES PATENT AND TRADEMARK OFFICE
CERTIFICATE OF CORRECTION

PATENT NO. : 4,569,868

DATED : February 11, 1986

INVENTOR(S) : Francis J.A.M.C. De Blauwe & Frank K.A. Selleslags

It is certified that error appears in the above-identified patent and that said Letters Patent are hereby corrected as shown below:

14. A method according to claim 13 wherein said second expansion ratio is at least 4.0.

15. A method according to claim 14 wherein said second expansion ratio is at least 5.0.

16. A method according to claim 14 wherein said first expansion ratio is 1.0 to 2.0.

17. A method of providing an end cap on a hollow conduit which comprises the steps of:

(a) placing around the end of the hollow conduit the open end section only of a heat-shrinkable tubular cap comprising an open end section defining the open end of the cap and having a first expansion ratio, an intermediate section adjacent said open end section and having a second expansion ratio and a closed end section having a third expansion ratio, the second expansion ratio being greater than the first and third expansion ratios; and (b) heating said open end section to cause shrinkage thereof into contact with the conduit without causing substantial shrinkage of the remainder of the cap.

18. A method according to claim 17 wherein the internal circumference of the open end section is slightly larger than the external circumference of the intermediate section and the intermediate section is composed of flexible material, and which comprises,

UNITED STATES PATENT AND TRADEMARK OFFICE
CERTIFICATE OF CORRECTION

PATENT NO. : 4,569,868

DATED : February 11, 1986

INVENTOR(S) : Francis J.A.M.C. De Blauwe & Frank K.A. Selleslags

It is certified that error appears in the above-identified patent and that said Letters Patent are hereby corrected as shown below:

after step (a) and before step (b), the step of pushing along the axis of the cap so that the closed end section and the intermediate section are telescoped through the open end section and into the interior of the hollow conduit and are maintained therein while the open end section is heated in step (b).

19. A method according to claim 18 wherein the cap is provided with a gripping protruberance on the outside of the closed end section.

20. A method according to claim 18 which comprises, after the step of shrinking said open end section in step (b), the steps of cutting off the end of the closed end section to create a second open end section having an expansion ratio greater than the expansion ratio of the intermediate section; passing an elongate substrate through the hollow conduit and the second open end section; and heating the intermediate section and the second open end section of the article to cause shrinkage of the intermediate section into contact with the elongate substrate.

21. A method according to claim 18 wherein said second expansion ratio is at least 3.0 and each of said first and third expansion ratios is 1.0 to 3.0 and at least 0.5 less than said second expansion ratio.

22. A method according to claim 21 wherein the first expansion ratio is 1.0 to 2.0, the second expansion ratio is at least 4.0 and the third expansion ratio is 1.0 to 2.0.

Signed and Sealed this

Tenth Day of June 1986

[SEAL]

Attest:

DONALD J. QUIGG

Attesting Officer

Commissioner of Patents and Trademarks